(12) United States Patent
Dunn

(10) Patent No.: US 10,970,658 B2
(45) Date of Patent: Apr. 6, 2021

(54) TECHNIQUES FOR BEHAVIORAL PAIRING IN A DISPATCH CENTER SYSTEM

(71) Applicant: Afiniti International Holdings, Ltd., Hamilton (BM)

(72) Inventor: Robert Gardner Dunn, Glasgow (GB)

(73) Assignee: Afiniti, Ltd., Hamilton (BM)

( * ) Notice: Subject to any disclaimer, the term of this patent is extended or adjusted under 35 U.S.C. 154(b) by 482 days.

(21) Appl. No.: 15/480,034

(22) Filed: Apr. 5, 2017

(65) Prior Publication Data
US 2018/0293530 A1   Oct. 11, 2018

(51) Int. Cl.
*G06Q 10/06* (2012.01)
*G06Q 10/04* (2012.01)

(52) U.S. Cl.
CPC ..... *G06Q 10/063112* (2013.01); *G06Q 10/04* (2013.01); *G06Q 10/067* (2013.01)

(58) Field of Classification Search
None
See application file for complete search history.

(56) References Cited

U.S. PATENT DOCUMENTS

| | | |
|---|---|---|
| 5,155,763 A | 10/1992 | Bigus et al. |
| 5,206,903 A | 4/1993 | Kohler et al. |
| 5,327,490 A | 7/1994 | Cave |
| 5,537,470 A | 7/1996 | Lee |
| 5,702,253 A | 12/1997 | Bryce et al. |
| 5,825,869 A | 10/1998 | Brooks et al. |
| 5,903,641 A | 5/1999 | Tonisson |

(Continued)

FOREIGN PATENT DOCUMENTS

| | | |
|---|---|---|
| AU | 2008349500 C1 | 5/2014 |
| AU | 2009209317 B2 | 5/2014 |

(Continued)

OTHER PUBLICATIONS

Cortés, Cristián E., et al. "Branch-and-price and constraint programming for solving a real-life technician dispatching problem." European Journal of Operational Research 238.1 (2014): 300-312. (Year: 2014).*

(Continued)

*Primary Examiner* — Matthew S Gart
*Assistant Examiner* — Derick J Holzmacher
(74) *Attorney, Agent, or Firm* — Wilmer Cutler Pickering Hale and Dorr LLP

(57) ABSTRACT

Techniques for behavioral pairing in a dispatch center system are disclosed. In one particular embodiment, the techniques may be realized as a method for behavioral pairing in a dispatch center system comprising determining, by at least one computer processor communicatively coupled to and configured to operate in the dispatch center system, a dispatch request for a customer; determining, by the at least one computer processor, a plurality of field agents available to service the customer's dispatch request; determining, by the at least one computer processor, a model of preferred field agent-customer pairings based at least in part on historical field agent-customer interaction outcome data; selecting, by the at least one computer processor, one of the plurality of field agents based on the model; and outputting, by the at least one computer processor, the selection to facilitate dispatching the selected field agent to the customer.

21 Claims, 3 Drawing Sheets

(56) References Cited

U.S. PATENT DOCUMENTS

| | | | |
|---|---|---|---|
| 5,907,601 A | 5/1999 | David et al. | |
| 5,926,538 A | 7/1999 | Deryugin et al. | |
| 6,049,603 A | 4/2000 | Schwartz et al. | |
| 6,052,460 A | 4/2000 | Fisher et al. | |
| 6,064,731 A | 5/2000 | Flockhart et al. | |
| 6,088,444 A | 7/2000 | Walker et al. | |
| 6,163,607 A | 12/2000 | Bogart et al. | |
| 6,222,919 B1 | 4/2001 | Hollatz et al. | |
| 6,292,555 B1 | 9/2001 | Okamoto | |
| 6,324,282 B1 | 11/2001 | McIllwaine et al. | |
| 6,333,979 B1 | 12/2001 | Bondi et al. | |
| 6,389,132 B1 | 5/2002 | Price | |
| 6,389,400 B1 | 5/2002 | Bushey et al. | |
| 6,408,066 B1 | 6/2002 | Andruska et al. | |
| 6,411,687 B1 | 6/2002 | Bohacek et al. | |
| 6,424,709 B1 | 7/2002 | Doyle et al. | |
| 6,434,230 B1 | 8/2002 | Gabriel | |
| 6,496,580 B1 | 12/2002 | Chack | |
| 6,504,920 B1 | 1/2003 | Okon et al. | |
| 6,519,335 B1 | 2/2003 | Bushnell | |
| 6,535,600 B1 | 3/2003 | Fisher et al. | |
| 6,535,601 B1 | 3/2003 | Flockhart et al. | |
| 6,564,227 B2 * | 5/2003 | Sakakibara | G06F 11/0709 |
| 6,570,980 B1 | 5/2003 | Baruch | |
| 6,587,556 B1 | 7/2003 | Judkins et al. | |
| 6,603,854 B1 | 8/2003 | Judkins et al. | |
| 6,639,976 B1 | 10/2003 | Shellum et al. | |
| 6,661,889 B1 | 12/2003 | Flockhart et al. | |
| 6,704,410 B1 | 3/2004 | McFarlane et al. | |
| 6,707,904 B1 | 3/2004 | Judkins et al. | |
| 6,714,643 B1 | 3/2004 | Gargeya et al. | |
| 6,763,104 B1 | 7/2004 | Judkins et al. | |
| 6,774,932 B1 | 8/2004 | Ewing et al. | |
| 6,775,378 B1 | 8/2004 | Villena et al. | |
| 6,798,876 B1 | 9/2004 | Bala | |
| 6,829,348 B1 | 12/2004 | Schroeder et al. | |
| 6,832,203 B1 | 12/2004 | Villena et al. | |
| 6,859,529 B2 | 2/2005 | Duncan et al. | |
| 6,895,083 B1 | 5/2005 | Bers et al. | |
| 6,922,466 B1 | 7/2005 | Peterson et al. | |
| 6,937,715 B2 | 8/2005 | Delaney | |
| 6,956,941 B1 | 10/2005 | Duncan et al. | |
| 6,970,821 B1 | 11/2005 | Shambaugh et al. | |
| 6,978,006 B1 | 12/2005 | Polcyn | |
| 7,023,979 B1 | 4/2006 | Wu et al. | |
| 7,039,166 B1 | 5/2006 | Peterson et al. | |
| 7,050,566 B2 | 5/2006 | Becerra et al. | |
| 7,050,567 B1 | 5/2006 | Jensen | |
| 7,062,031 B2 | 6/2006 | Becerra et al. | |
| 7,068,775 B1 | 6/2006 | Lee | |
| 7,092,509 B1 | 8/2006 | Mears et al. | |
| 7,103,172 B2 | 9/2006 | Brown et al. | |
| 7,158,628 B2 | 1/2007 | McConnell et al. | |
| 7,184,540 B2 | 2/2007 | Dezonno et al. | |
| 7,209,549 B2 | 4/2007 | Reynolds et al. | |
| 7,231,032 B2 | 6/2007 | Nevman et al. | |
| 7,231,034 B1 | 6/2007 | Rikhy et al. | |
| 7,236,584 B2 | 6/2007 | Torba | |
| 7,245,716 B2 | 7/2007 | Brown et al. | |
| 7,245,719 B2 | 7/2007 | Kawada et al. | |
| 7,266,251 B2 | 9/2007 | Rowe | |
| 7,269,253 B1 | 9/2007 | Wu et al. | |
| 7,353,388 B1 | 4/2008 | Gilman et al. | |
| 7,398,224 B2 | 7/2008 | Cooper | |
| 7,593,521 B2 | 9/2009 | Becerra et al. | |
| 7,624,024 B2 * | 11/2009 | Levis | G06Q 10/08 705/1.1 |
| 7,676,034 B1 | 3/2010 | Wu et al. | |
| 7,725,339 B1 | 5/2010 | Aykin | |
| 7,734,032 B1 | 6/2010 | Kiefhaber et al. | |
| 7,798,876 B2 | 9/2010 | Mix | |
| 7,817,796 B1 * | 10/2010 | Clippinger | H04M 3/5191 379/266.01 |
| 7,826,597 B2 | 11/2010 | Berner et al. | |
| 7,864,944 B2 | 1/2011 | Khouri et al. | |
| 7,899,177 B1 | 3/2011 | Bruening et al. | |
| 7,916,858 B1 | 3/2011 | Heller et al. | |
| 7,940,917 B2 | 5/2011 | Lauridsen et al. | |
| 7,961,866 B1 | 6/2011 | Boutcher et al. | |
| 7,995,717 B2 | 8/2011 | Conway et al. | |
| 8,000,989 B1 | 8/2011 | Kiefhaber et al. | |
| 8,010,607 B2 | 8/2011 | McCormack et al. | |
| 8,094,790 B2 | 1/2012 | Conway et al. | |
| 8,126,133 B1 | 2/2012 | Everingham et al. | |
| 8,140,441 B2 | 3/2012 | Cases et al. | |
| 8,175,253 B2 | 5/2012 | Knott et al. | |
| 8,229,102 B2 | 7/2012 | Knott et al. | |
| 8,249,245 B2 | 8/2012 | Jay et al. | |
| 8,295,471 B2 | 10/2012 | Spottiswoode et al. | |
| 8,300,798 B1 | 10/2012 | Wu et al. | |
| 8,359,219 B2 | 1/2013 | Chishti et al. | |
| 8,433,597 B2 | 4/2013 | Chishti et al. | |
| 8,472,611 B2 | 6/2013 | Chishti | |
| 8,565,410 B2 | 10/2013 | Chishti et al. | |
| 8,606,611 B1 * | 12/2013 | Fedorov | G06Q 10/103 705/7.13 |
| 8,634,542 B2 | 1/2014 | Spottiswoode et al. | |
| 8,644,490 B2 | 2/2014 | Stewart | |
| 8,670,548 B2 | 3/2014 | Xie et al. | |
| 8,699,694 B2 | 4/2014 | Chishti et al. | |
| 8,712,821 B2 | 4/2014 | Spottiswoode | |
| 8,718,271 B2 | 5/2014 | Spottiswoode | |
| 8,724,797 B2 | 5/2014 | Chishti et al. | |
| 8,731,178 B2 | 5/2014 | Chishti et al. | |
| 8,737,595 B2 | 5/2014 | Chishti et al. | |
| 8,750,488 B2 | 6/2014 | Spottiswoode et al. | |
| 8,761,380 B2 | 6/2014 | Kohler et al. | |
| 8,781,100 B2 | 7/2014 | Spottiswoode et al. | |
| 8,781,106 B2 | 7/2014 | Afzal | |
| 8,792,630 B2 | 7/2014 | Chishti et al. | |
| 8,824,658 B2 | 9/2014 | Chishti | |
| 8,831,207 B1 | 9/2014 | Agarwal | |
| 8,879,715 B2 | 11/2014 | Spottiswoode et al. | |
| 8,903,079 B2 | 12/2014 | Xie et al. | |
| 8,913,736 B2 | 12/2014 | Kohler et al. | |
| 8,929,537 B2 | 1/2015 | Chishti et al. | |
| 8,995,647 B2 | 3/2015 | Li et al. | |
| 9,020,137 B2 | 4/2015 | Chishti et al. | |
| 9,025,757 B2 | 5/2015 | Spottiswoode et al. | |
| 9,077,736 B2 * | 7/2015 | Werth | H04W 76/10 |
| 9,215,323 B2 | 12/2015 | Chishti | |
| 9,247,065 B2 * | 1/2016 | Walls | H04M 3/5233 |
| 9,277,055 B2 | 3/2016 | Spottiswoode et al. | |
| 9,300,802 B1 | 3/2016 | Chishti | |
| 9,426,296 B2 | 8/2016 | Chishti et al. | |
| 9,712,676 B1 | 7/2017 | Chishti | |
| 9,712,679 B2 | 7/2017 | Chishti et al. | |
| 9,881,268 B1 * | 1/2018 | Briggs | G06Q 40/08 |
| 9,930,180 B1 | 3/2018 | Kan et al. | |
| 9,942,405 B1 | 4/2018 | Kan et al. | |
| 2001/0032120 A1 | 10/2001 | Stuart et al. | |
| 2002/0018554 A1 | 2/2002 | Jensen et al. | |
| 2002/0046030 A1 | 4/2002 | Haritsa et al. | |
| 2002/0059164 A1 | 5/2002 | Shtivelman | |
| 2002/0082736 A1 | 6/2002 | Lech et al. | |
| 2002/0110234 A1 | 8/2002 | Walker et al. | |
| 2002/0111172 A1 | 8/2002 | DeWolf et al. | |
| 2002/0131399 A1 | 9/2002 | Philonenko | |
| 2002/0138285 A1 | 9/2002 | DeCotiis et al. | |
| 2002/0143599 A1 | 10/2002 | Nourbakhsh et al. | |
| 2002/0161765 A1 | 10/2002 | Kundrot et al. | |
| 2002/0184069 A1 | 12/2002 | Kosiba et al. | |
| 2002/0196845 A1 | 12/2002 | Richards et al. | |
| 2003/0002653 A1 | 1/2003 | Uckun | |
| 2003/0059029 A1 | 3/2003 | Mengshoel et al. | |
| 2003/0081757 A1 | 5/2003 | Mengshoel et al. | |
| 2003/0095652 A1 | 5/2003 | Mengshoel et al. | |
| 2003/0169870 A1 | 9/2003 | Stanford | |
| 2003/0174830 A1 | 9/2003 | Boyer et al. | |
| 2003/0217016 A1 | 11/2003 | Pericle | |
| 2004/0028211 A1 | 2/2004 | Culp et al. | |
| 2004/0057416 A1 | 3/2004 | McCormack | |
| 2004/0096050 A1 | 5/2004 | Das et al. | |
| 2004/0098274 A1 | 5/2004 | Dezonno et al. | |

(56) References Cited

U.S. PATENT DOCUMENTS

| | | |
|---|---|---|
| 2004/0101127 A1 | 5/2004 | Dezonno et al. |
| 2004/0109555 A1 | 6/2004 | Williams |
| 2004/0133434 A1 | 7/2004 | Szlam et al. |
| 2004/0199805 A1* | 10/2004 | Yasunaga ............ G06Q 10/109 714/2 |
| 2004/0210475 A1 | 10/2004 | Starnes et al. |
| 2004/0230438 A1 | 11/2004 | Pasquale et al. |
| 2004/0267816 A1 | 12/2004 | Russek |
| 2005/0013428 A1 | 1/2005 | Walters |
| 2005/0043986 A1 | 2/2005 | McConnell et al. |
| 2005/0047581 A1 | 3/2005 | Shaffer et al. |
| 2005/0047582 A1 | 3/2005 | Shaffer et al. |
| 2005/0071223 A1 | 3/2005 | Jain et al. |
| 2005/0129212 A1 | 6/2005 | Parker |
| 2005/0135593 A1 | 6/2005 | Becerra et al. |
| 2005/0135596 A1 | 6/2005 | Zhao |
| 2005/0187802 A1 | 8/2005 | Koeppel |
| 2005/0195960 A1 | 9/2005 | Shaffer et al. |
| 2005/0286709 A1 | 12/2005 | Horton et al. |
| 2006/0098803 A1 | 5/2006 | Bushey et al. |
| 2006/0110052 A1 | 5/2006 | Finlayson |
| 2006/0124113 A1 | 6/2006 | Roberts |
| 2006/0184040 A1 | 8/2006 | Keller et al. |
| 2006/0222164 A1 | 10/2006 | Contractor et al. |
| 2006/0233346 A1 | 10/2006 | McIlwaine et al. |
| 2006/0262918 A1 | 11/2006 | Karnalkar et al. |
| 2006/0262922 A1 | 11/2006 | Margulies et al. |
| 2007/0036323 A1 | 2/2007 | Travis |
| 2007/0071222 A1 | 3/2007 | Flockhart et al. |
| 2007/0121602 A1 | 5/2007 | Sin et al. |
| 2007/0121829 A1 | 5/2007 | Tal et al. |
| 2007/0136342 A1 | 6/2007 | Singhai et al. |
| 2007/0153996 A1 | 7/2007 | Hansen |
| 2007/0154007 A1 | 7/2007 | Bernhard |
| 2007/0174111 A1 | 7/2007 | Anderson et al. |
| 2007/0198322 A1 | 8/2007 | Bourne et al. |
| 2007/0211881 A1 | 9/2007 | Parker-Stephen |
| 2007/0219816 A1 | 9/2007 | Van Luchene et al. |
| 2007/0274502 A1 | 11/2007 | Brown |
| 2008/0002823 A1 | 1/2008 | Fama et al. |
| 2008/0008309 A1 | 1/2008 | Dezonno et al. |
| 2008/0046386 A1 | 2/2008 | Pieraccinii et al. |
| 2008/0065476 A1 | 3/2008 | Klein et al. |
| 2008/0118052 A1 | 5/2008 | Houmaidi et al. |
| 2008/0147470 A1* | 6/2008 | Johri ................ G06Q 10/06 379/265.11 |
| 2008/0152122 A1 | 6/2008 | Idan et al. |
| 2008/0181389 A1 | 7/2008 | Bourne et al. |
| 2008/0199000 A1 | 8/2008 | Su et al. |
| 2008/0205611 A1 | 8/2008 | Jordan et al. |
| 2008/0267386 A1 | 10/2008 | Cooper |
| 2008/0273687 A1 | 11/2008 | Knott et al. |
| 2009/0018890 A1* | 1/2009 | Werth ............ G06Q 10/063112 705/7.14 |
| 2009/0043670 A1 | 2/2009 | Johansson et al. |
| 2009/0086933 A1 | 4/2009 | Patel et al. |
| 2009/0092241 A1* | 4/2009 | Minert ........... G06Q 10/063112 379/265.06 |
| 2009/0190740 A1 | 7/2009 | Chishti et al. |
| 2009/0190743 A1 | 7/2009 | Spottiswoode |
| 2009/0190744 A1 | 7/2009 | Xie et al. |
| 2009/0190745 A1 | 7/2009 | Xie et al. |
| 2009/0190746 A1 | 7/2009 | Chishti et al. |
| 2009/0190747 A1 | 7/2009 | Spottiswoode |
| 2009/0190748 A1 | 7/2009 | Chishti et al. |
| 2009/0190749 A1 | 7/2009 | Xie et al. |
| 2009/0190750 A1 | 7/2009 | Xie et al. |
| 2009/0232294 A1 | 9/2009 | Xie et al. |
| 2009/0234710 A1 | 9/2009 | Belgaied Hassine et al. |
| 2009/0245493 A1 | 10/2009 | Chen et al. |
| 2009/0304172 A1 | 12/2009 | Becerra et al. |
| 2009/0318111 A1 | 12/2009 | Desai et al. |
| 2009/0323921 A1 | 12/2009 | Spottiswoode et al. |
| 2010/0020959 A1 | 1/2010 | Spottiswoode |
| 2010/0020961 A1 | 1/2010 | Spottiswoode |
| 2010/0054431 A1 | 3/2010 | Jaiswal et al. |
| 2010/0054452 A1 | 3/2010 | Afzal |
| 2010/0054453 A1 | 3/2010 | Stewart |
| 2010/0086120 A1 | 4/2010 | Brussat et al. |
| 2010/0111285 A1 | 5/2010 | Chishti |
| 2010/0111286 A1 | 5/2010 | Chishti |
| 2010/0111287 A1 | 5/2010 | Xie et al. |
| 2010/0111288 A1 | 5/2010 | Afzal et al. |
| 2010/0142698 A1 | 6/2010 | Spottiswoode et al. |
| 2010/0158238 A1 | 6/2010 | Saushkin |
| 2010/0183138 A1 | 7/2010 | Spottiswoode et al. |
| 2010/0312604 A1* | 12/2010 | Mitchell ............ G06Q 10/1093 705/7.13 |
| 2010/0312605 A1* | 12/2010 | Mitchell ................ G06Q 10/06 705/7.13 |
| 2011/0022357 A1 | 1/2011 | Vock et al. |
| 2011/0031112 A1 | 2/2011 | Birang et al. |
| 2011/0069821 A1 | 3/2011 | Korolev et al. |
| 2011/0125048 A1 | 5/2011 | Causevic et al. |
| 2012/0051536 A1 | 3/2012 | Chishti et al. |
| 2012/0051537 A1 | 3/2012 | Chishti et al. |
| 2012/0084111 A1* | 4/2012 | Aggarwal ............... G06Q 30/01 705/7.14 |
| 2012/0224680 A1 | 9/2012 | Spottiswoode et al. |
| 2012/0278136 A1 | 11/2012 | Flockhart et al. |
| 2013/0003959 A1 | 1/2013 | Nishikawa et al. |
| 2013/0054306 A1* | 2/2013 | Bhalla .................... G06Q 30/02 705/7.31 |
| 2013/0251137 A1 | 9/2013 | Chishti et al. |
| 2013/0287202 A1 | 10/2013 | Flockhart et al. |
| 2014/0044246 A1 | 2/2014 | Klemm et al. |
| 2014/0079210 A1 | 3/2014 | Kohler et al. |
| 2014/0119531 A1 | 5/2014 | Tuchman et al. |
| 2014/0119533 A1 | 5/2014 | Spottiswoode et al. |
| 2014/0149164 A1* | 5/2014 | Yumbe ........... G06Q 10/063114 705/7.15 |
| 2014/0278661 A1* | 9/2014 | Nielsen ............ G06Q 10/06311 705/7.17 |
| 2014/0341370 A1 | 11/2014 | Li et al. |
| 2015/0055772 A1 | 2/2015 | Klemm et al. |
| 2015/0161563 A1* | 6/2015 | Mehrabi .......... G06Q 10/08355 705/338 |
| 2015/0281448 A1 | 10/2015 | Putra et al. |
| 2016/0080573 A1* | 3/2016 | Chishti ................ H04M 3/5183 379/265.11 |
| 2017/0064080 A1 | 3/2017 | Chishti et al. |
| 2017/0064081 A1 | 3/2017 | Chishti et al. |

FOREIGN PATENT DOCUMENTS

| | | |
|---|---|---|
| AU | 2009311534 B2 | 8/2014 |
| CN | 102301688 B | 5/2014 |
| CN | 102017591 B | 11/2014 |
| EP | 0 493 292 A2 | 7/1992 |
| EP | 0 949 793 A1 | 10/1999 |
| EP | 1 032 188 A1 | 8/2000 |
| EP | 1335572 A2 | 8/2003 |
| JP | 11-098252 A | 4/1999 |
| JP | 2000-069168 A | 3/2000 |
| JP | 2000-078291 A | 3/2000 |
| JP | 2000-078292 A | 3/2000 |
| JP | 2000-092213 A | 3/2000 |
| JP | 2000-236393 A | 8/2000 |
| JP | 2001-292236 A | 10/2001 |
| JP | 2001-518753 A | 10/2001 |
| JP | 2002-297900 A | 10/2002 |
| JP | 3366565 B2 | 1/2003 |
| JP | 2003-187061 A | 7/2003 |
| JP | 2004-056517 A | 2/2004 |
| JP | 2004-227228 A | 8/2004 |
| JP | 2006-345132 A | 12/2006 |
| JP | 2007-324708 A | 12/2007 |
| JP | 2011-511533 A | 4/2011 |
| JP | 2011-511536 A | 4/2011 |
| JP | 5421928 B2 | 2/2014 |
| JP | 5631326 B2 | 11/2014 |
| JP | 5649575 B2 | 1/2015 |
| JP | 2015-514371 A | 5/2015 |

(56) References Cited

FOREIGN PATENT DOCUMENTS

| | | | | |
|---|---|---|---|---|
| MX | 316118 | | 12/2013 | |
| MX | 322251 | | 7/2014 | |
| NZ | 587100 | B | 10/2013 | |
| NZ | 587101 | B | 10/2013 | |
| NZ | 591486 | B | 1/2014 | |
| NZ | 592781 | B | 3/2014 | |
| PH | 1-2010-501704 | | 2/2014 | |
| PH | 1-2010-501705 | | 2/2015 | |
| WO | WO-9838823 | A2 * | 9/1998 | ............ H04W 24/00 |
| WO | WO-1999/017517 | A1 | 4/1999 | |
| WO | WO-2001/063894 | A2 | 8/2001 | |
| WO | WO-2006/124113 | A2 | 11/2006 | |
| WO | WO-2009/097018 | A1 | 8/2009 | |
| WO | WO-2009097210 | A1 * | 8/2009 | ............ H04M 3/523 |
| WO | WO-2010/053701 | A2 | 5/2010 | |
| WO | WO-2010053701 | A2 * | 5/2010 | .......... H04M 3/5232 |
| WO | WO-2011/081514 | A1 | 7/2011 | |
| WO | WO-2011081514 | A1 * | 7/2011 | ......... G05B 23/0221 |
| WO | WO-2013148453 | A1 * | 10/2013 | .......... H04M 3/5175 |
| WO | WO-2016048290 | A1 * | 3/2016 | .......... H04M 3/5141 |

OTHER PUBLICATIONS

Cicirello, Vincent A., and Stephen F. Smith. "Distributed coordination of resources via wasp-like agents." Workshop on Radical Agent Concepts. Springer, Berlin, Heidelberg, 2002. (Year: 2002).*
Anonymous. (2006) "Performance Based Routing in Profit Call Centers," The Decision Makers' Direct, located at www.decisioncraft.com, Issue Jun. 2002 (3 pages).
Canadian Office Action issued in Canadian Patent Application No. 2713526, dated Oct. 25, 2016, 7 pages.
Cleveland, William S., "Robust Locally Weighted Regression and Smoothing Scatterplots," Journal of the American Statistical Association, vol. 74, No. 368, pp. 829-836 (Dec. 1979).
Cormen, T. H., et al., "Introduction to Algorithms," 3rd Edition, Chapter 26 Maximum Flow, pp. 708-766 and Chapter 29 Linear Programming, pp. 843-897 (2009).
Extended European Search Report issued by the European Patent Office for European Application No. 17154781.3 dated May 4, 2017 (7 pages).
Extended European Search Report issued by the European Patent Office for European Application No. 17171761.4 dated Aug. 30, 2017 (8 pages).
Gans, N. et al. (2003), "Telephone Call Centers: Tutorial, Review and Research Prospects," Manufacturing & Service Operations Management, vol. 5, No. 2, pp. 79-141, 84 pages.
International Preliminary Report on Patentability issued in connection with PCT Application No. PCT/US2009/066254 dated Jun. 14, 2011 (6 pages).
International Search Report and Written Opinion issued by the European Patent Office as International Searching Authority for International Application No. PCT/IB2016/001762 dated Feb. 20, 2017 (15 pages).
International Search Report and Written Opinion issued by the European Patent Office as International Searching Authority for International Application No. PCT/IB2016/001776 dated Mar. 3, 2017 (16 pages).
International Search Report and Written Opinion issued by the European Patent Office as International Searching Authority for International Application No. PCT/IB2017/000570 dated Jun. 30, 2017 (13 pages).
International Search Report and Written Opinion issued by the European Patent Office as International Searching Authority for International Application No. PCT/IB2018/000434 dated Jun. 20, 2018 (14 pages).
International Search Report issued in connection with International Application No. PCT/US13/33268 dated May 31, 2013 (2 pages).
International Search Report issued in connection with PCT Application No. PCT/US/2009/054352 dated Mar. 12, 2010, 5 pages.
International Search Report issued in connection with PCT Application No. PCT/US2008/077042 dated Mar. 13, 2009 (3 pages).
International Search Report issued in connection with PCT Application No. PCT/US2009/031611 dated Jun. 3, 2009 (5 pages).
International Search Report issued in connection with PCT Application No. PCT/US2009/066254 dated Feb. 24, 2010 (4 pages).
International Search Report issued in connection with PCT/US2009/061537 dated Jun. 7, 2010 (5 pages).
International Search Report issued in connection with PCT/US2013/033261 dated Jun. 14, 2013 (3 pages).
International Search Report issued in connection with PCT/US2013/33265 dated Jul. 9, 2013 (2 pages).
Japanese Office Action issued by the Japan Patent Office for Application No. 2015-503396 dated Jun. 29, 2016 (7 pages).
Japanese Office Action issued by the Japanese Patent Office for Japanese Application No. 2016-159338 dated Oct. 11, 2017 (12 pages).
Japanese Office Action issued by the Japanese Patent Office for Japanese Application No. 2016-189126 dated Oct. 19, 2017 (24 pages).
Koole, G. (2004). "Performance Analysis and Optimization in Customer Contact Centers," Proceedings of the Quantitative Evaluation of Systems, First International Conference, Sep. 27-30, 2004 (4 pages).
Koole, G. et al. (Mar. 6, 2006). "An Overview of Routing and Staffing Algorithms in Multi-Skill Customer Contact Centers," Manuscript, 42 pages.
Nocedal, J. and Wright, S. J., "Numerical Optimization," Chapter 16 Quadratic Programming, pp. 448-496 (2006).
Ntzoufras, "Bayesian Modeling Using Winbugs". Wiley Interscience, Chapter 5, Normal Regression Models, Oct. 18, 2007, pp. 155-220 (67 pages).
Press, W. H. and Rybicki, G. B., "Fast Algorithm for Spectral Analysis of Unevenly Sampled Data," The Astrophysical Journal, vol. 338, pp. 277-280 (Mar. 1, 1989).
Riedmiller, M. et al. (1993). "A Direct Adaptive Method for Faster Back Propagation Learning: The RPROP Algorithm," 1993 IEEE International Conference on Neural Networks, San Francisco, CA, Mar. 28-Apr. 1, 1993, 1:586-591.
Stanley et al., "Improving call center operations using performance-based routing strategies," Calif. Journal of Operations Management, 6(1), 24-32, Feb. 2008; retrieved from http://userwww.sfsu.edu/saltzman/Publist.html.
Subsequent Substantive Examination Report issued in connection with Philippines Application No. 1-2010-501705 dated Jul. 14, 2014 (1 page).
Substantive Examination Report issued in connection with Philippines Application No. 1/2011/500868 dated May 2, 2014 (1 page).
Written Opinion of the International Searching Aurhority issued in connection with PCT Application No. PCT/US2008/077042 dated Mar. 13, 2009, 6 pages.
Written Opinion of the International Searching Authority issued in connection with International Application No. PCT/US13/33268 dated May 31, 2013, 7 pages.
Written Opinion of the International Searching Authority issued in connection with PCT Application No. PCT/US/2009/054352 dated Mar. 12, 2010, 5 pages.
Written Opinion of the International Searching Authority issued in connection with PCT Application No. PCT/US2009/031611 dated Jun. 3, 2009, 7 pages.
Written Opinion of the International Searching Authority issued in connection with PCT Application No. PCT/US2009/066254 dated Feb. 24, 2010, 5 pages.
Written Opinion of the International Searching Authority issued in connection with PCT/US2009/061537 dated Jun. 7, 2010, 10 pages.
Written Opinion of the International Searching Authority issued in connection with PCT/US2013/033261 dated Jun. 14, 2013, 7 pages.
Written Opinion of the International Searching Authority issued in connection with PCT/US2013/33265 dated Jul. 9, 2013, 7 pages.
Ioannis Ntzoufras "Bayesian Modeling Using Winbugs: An Introduction", Department of Statistics, Athens University of Economics

(56) References Cited

OTHER PUBLICATIONS and Business, Wiley-Interscience, A John Wiley & Sons, Inc., Publication, Chapter 5, Jan. 1, 2007, pp. 155-220 (67 pages).

* cited by examiner

TECHNIQUES FOR BEHAVIORAL PAIRING IN A DISPATCH CENTER SYSTEM

FIELD OF THE DISCLOSURE

This disclosure generally relates to pairing dispatched field agents with customers through dispatch centers and, more particularly, to techniques for behavioral pairing in a dispatch center system.

BACKGROUND OF THE DISCLOSURE

A typical dispatch center algorithmically assigns customers requesting service to field agents available for assignment to those customers. The dispatch center may include a contact center for receiving customer requests (e.g., telephone calls, Internet chat sessions or forms, emails, text messages). The field agents may perform a variety of tasks in various sectors, such as cable installation for a telecommunications company, claim adjusting for an insurance company, etc.

In some typical dispatch centers, customers are assigned to field agents ordered based on which field agent has been waiting the longest for a new dispatch, appointment availability, location, etc. Field agents and/or customers may be assigned to each other on a first-come, first-served basis. This strategy may be referred to as a "first-in, first-out", "FIFO", or "round-robin" strategy.

In some advanced contact centers, contacts (e.g., callers) are paired with agents (e.g., phone agents) using a "behavioral pairing," or a "BP" strategy, under which contacts and agents may be deliberately (preferentially) paired in a fashion that enables the assignment of subsequent contact-agent pairs such that when the benefits of all the assignments under a BP strategy are totaled they may exceed those of FIFO and other strategies such as performance-based routing ("PBR") strategies. BP is designed to encourage balanced utilization of agents within a skill queue while nevertheless simultaneously improving overall contact center performance beyond what FIFO or PBR methods will allow. This is a remarkable achievement inasmuch as BP acts on the same contacts and same agents as FIFO or PBR methods, utilizes agents approximately evenly as FIFO provides, and yet improves overall contact center performance. BP is described in, e.g., U.S. Pat. No. 9,300,802, which is incorporated by reference herein. Additional information about these and other features regarding the pairing or matching modules (sometimes also referred to as "SATMAP", "routing system", "routing engine", etc.) is described in, for example, U.S. Pat. No. 8,879,715, which is incorporated by reference herein.

However, even these advanced contact centers using BP dispatch field agents to customers using a suboptimal strategy such as FIFO. Field agents have numerous opportunities to deliver value to customers on behalf of their companies, such as customer satisfaction, up-selling and cross-selling, job completion time, etc., and under a FIFO pairing strategy, field agents will not be paired with customers so as to optimize dispatch center performance.

For example, in the television provider industry, a field technician may be dispatched to a customer residence to install or repair access to content via satellite, fiber optics, coaxial cable, etc. During the customer interaction, the field technician may have an opportunity to develop a rapport with the customer, thereby improving customer satisfaction with the installation or repair experience. The field technician may also have an opportunity to assess the customer's other needs and inform the customer about additional products or services (e.g., premium channel subscriptions, warranties, screen wipes, sound bars), generating additional up-sell or cross-sell revenue along with increased customer satisfaction. Therefore, determining a preferred pairing between a field agent and a customer may increase the likelihood of an optimal field agent-customer interaction over a typical FIFO pairing strategy.

In view of the foregoing, it may be understood that there is a need for a system that enables improving the efficiency and performance of dispatch pairing strategies that are distend to choose among multiple possible dispatch pairings such as a BP strategy.

SUMMARY OF THE DISCLOSURE

Techniques for behavioral pairing in a dispatch center system are disclosed. In one particular embodiment, the techniques may be realized as a method for behavioral pairing in a dispatch center system comprising determining, by at least one computer processor communicatively coupled to and configured to operate in the dispatch center system, a dispatch request for a customer; determining, by the at least one computer processor, a plurality of field agents available to service the customer's dispatch request; determining, by the at least one computer processor, a model of preferred field agent-customer pairings based at least in part on historical field agent-customer interaction outcome data; selecting, by the at least one computer processor, one of the plurality of field agents based on the model; and outputting, by the at least one computer processor, the selection to facilitate dispatching the selected field agent to the customer.

In accordance with other aspects of this particular embodiment, the dispatch request comprises at least one requested dispatch time, and determining the plurality of field agents available to service the customer's dispatch request is constrained based on the at least one requested dispatch time.

In accordance with other aspects of this particular embodiment, the techniques may further comprise selecting, by the at least one computer processor, at least one suggested dispatch time, wherein the selected field agent is available during the at least one suggested dispatch time.

In accordance with other aspects of this particular embodiment, the selected field agent may be dispatched immediately or as soon as practicable after the selection.

In accordance with other aspects of this particular embodiment, the techniques may further comprise recording, by the at least one computer processor, results for a first plurality of field-agent customer interactions paired using a behavioral pairing strategy; recording, by the at least one computer processor, results for a second plurality of field-agent customer interactions paired using a FIFO pairing strategy; and outputting, by the at least one computer processor, a measure of relative performance between the behavioral pairing strategy and the FIFO pairing strategy based on the recorded results for the first and second pluralities of field-agent customer interactions.

In accordance with other aspects of this particular embodiment, the techniques may further comprise updating, by the at least one computer processor, the model based at least in part on one or more of: the results for the first plurality of field-agent customer interactions, the results for the second plurality of field-agent customer interactions, and the measure of relative performance.

In accordance with other aspects of this particular embodiment, the model may be based on a diagonal strategy.

In another particular embodiment, the techniques may be realized as a system for behavioral pairing in a dispatch center system comprising at least one computer processor communicatively coupled to and configured to operate in the dispatch center system, wherein the at least one computer processor is further configured to perform the steps in the above-discussed method.

In another particular embodiment, the techniques may be realized as an article of manufacture for behavioral pairing in a dispatch center system comprising a non-transitory processor readable medium and instructions stored on the medium, wherein the instructions are configured to be readable from the medium by at least one computer processor communicatively coupled to and configured to operate in the dispatch center system and thereby cause the at least one computer processor to operate to perform the steps in the above-discussed method.

The present disclosure will now be described in more detail with reference to particular embodiments thereof as shown in the accompanying drawings. While the present disclosure is described below with reference to particular embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

To facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION

Figure 1:
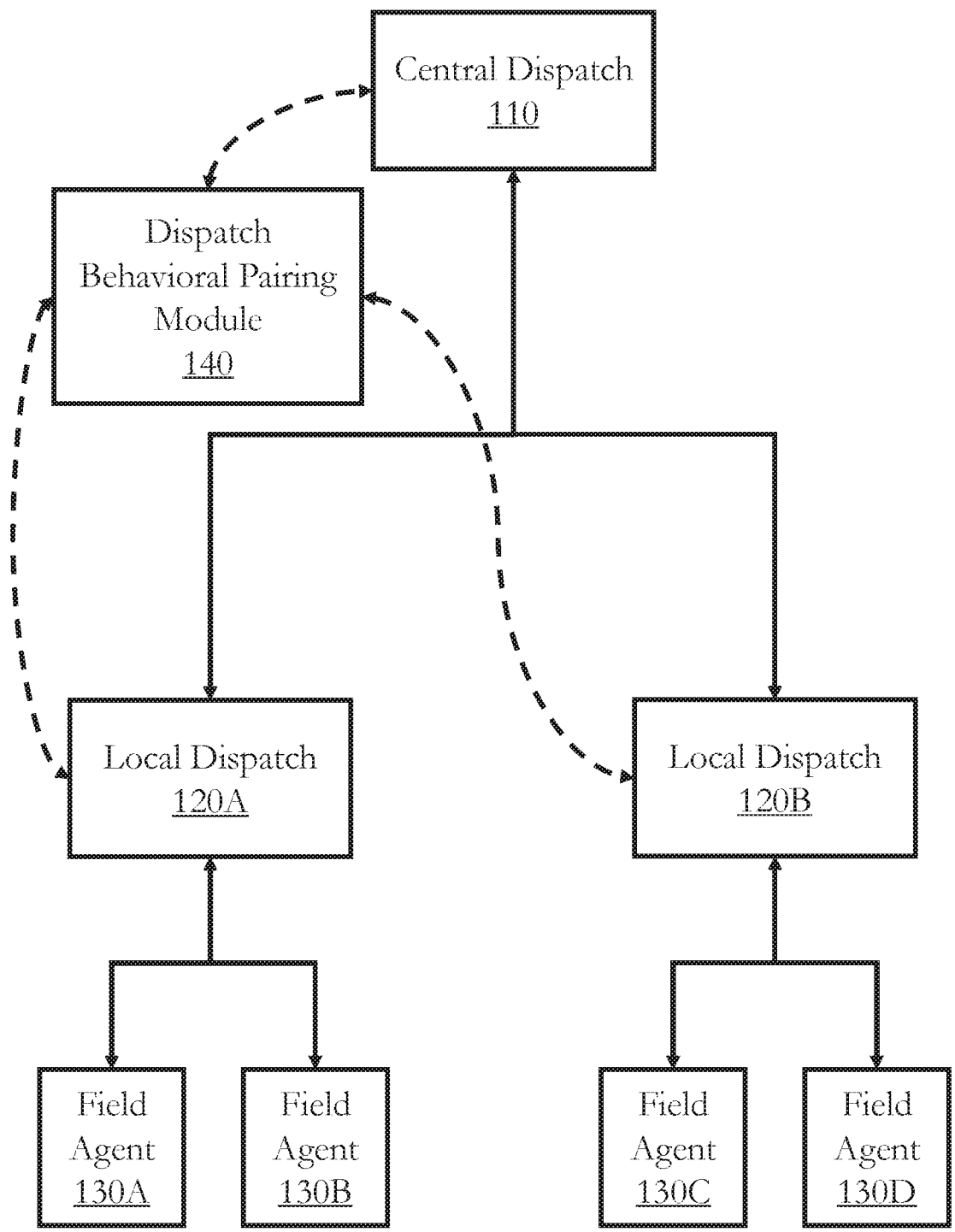
FIG. 1 shows a block diagram of a dispatch center system according to embodiments of the present disclosure.

FIG. 1 shows a block diagram of a dispatch center system 100 according to embodiments of the present disclosure. The description herein describes network elements, computers, and/or components of a system and method for simulating dispatch center systems that may include one or more modules. As used herein, the term "module" may be understood to refer to computing software, firmware, hardware, and/or various combinations thereof. Modules, however, are not to be interpreted as software which is not implemented on hardware, firmware, or recorded on a processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/ or other components local or remote to one another. Additionally, the modules may be moved from one device and added to another device, and/or may be included in both devices.

As shown in FIG. 1, the dispatch center system 100 may include a central dispatch 110. The central dispatch 110 may receive incoming customer requests (e.g., requests from callers) or support outbound connections to customers via a telecommunications network (not shown). The central dispatch 110 may include customer request routing hardware and software for helping to route customer requests among one or more dispatch centers, or to one or more PBX/ACDs or other queuing or switching components, including other Internet-based, cloud-based, or otherwise networked agent-customer hardware or software-based dispatch center solutions.

The central dispatch 110 may not be necessary such as if there is only one dispatch center, or if there is only one PBX/ACD routing component, in the dispatch center system 100. If more than one dispatch center is part of the dispatch center system 100, each dispatch center may include at least one local dispatch (e.g., local dispatches 120A and 120B). The local dispatches 120A and 120B may be communicatively coupled to the central dispatch 110. In embodiments, various topologies of routing and network components may be configured to implement the dispatch center system.

Each local dispatch for each dispatch center may be communicatively coupled to a plurality (or "pool") of field agents. Each dispatch center may support a certain number of field agents to be available for scheduling during a given time. At any given time, a field agent may be available and waiting to be dispatched to a contact (e.g., for immediate dispatch, or for an open appointment time at a future date and time), or the field agent may be unavailable for any of a number of reasons, such as already having been dispatched—or scheduled for a future dispatch—to another customer. The dispatch center may also account for additional field agent activities such as travel time to and from the customer, and performing certain post-dispatch functions such as logging information about the dispatch, or taking breaks.

In the example of FIG. 1, the central dispatch 110 routes customer requests to one of two local dispatches via local dispatch 120A and local dispatch 120B, respectively. Each of the local dispatches 120A and 120B are shown with two field agents each. Field agents 130A and 130B may be assigned or otherwise delegated to local dispatch 120A, and field agents 130C and 130D may be assigned or otherwise delegated to local dispatch 120B.

The dispatch center system 100 may also be communicatively coupled to an integrated service from, for example, a third party vendor. In the example of FIG. 1, dispatch BP module 140 may be communicatively coupled to one or more dispatches in the dispatch center system 100, such as central dispatch 110, local dispatch 120A, or local dispatch 120B. In some embodiments, central or local dispatches of the dispatch center system 100 may be communicatively coupled to multiple dispatch BP modules. In some embodiments, dispatch BP module 140 may be embedded within a component of a dispatch center system (e.g., embedded in or otherwise integrated with a dispatch center component, or a "BP dispatch center"). The dispatch BP module 140 may receive information from a dispatch component (e.g., local dispatch 120A) about field agents assigned to the dispatch (e.g., field agents 130A and 130B) and about incoming customer requests via another dispatch component (e.g., central dispatch 110) or, in some embodiments, from a network (e.g., the Internet or a telecommunications network) (not shown).

A dispatch center may include multiple pairing modules (e.g., a dispatch BP module and a dispatch FIFO module) (not shown), and one or more pairing modules may be provided by one or more different vendors. In some embodiments, one or more pairing modules may be components of dispatch BP module 140 or one or more dispatch components such as central dispatch 110 or local dispatches 120A and 120B. In some embodiments, a dispatch BP module may determine which pairing module may handle pairing for a particular customer or other contact. For example, the dispatch BP module may alternate between enabling pairing via the dispatch BP module and enabling pairing with the dispatch FIFO module. In other embodiments, one pairing module (e.g., the dispatch BP module) may be configured to emulate other pairing strategies. For example, a dispatch BP module, or a dispatch BP component integrated with dispatch BP components in the dispatch BP module, may determine whether the dispatch BP module may use BP or emulated FIFO pairing for a particular customer request. In this case, "BP on" may refer to times when the dispatch BP module is applying the BP strategy, and "BP off" may refer to other times when the dispatch BP module is applying a different pairing strategy (e.g., FIFO).

In some embodiments, regardless of whether pairing strategies are handled by separate modules, or if some pairing strategies are emulated within a single pairing module, the single pairing module may be configured to monitor and store information about pairings made under any or all pairing strategies. For example, a dispatch BP module may observe and record data about FIFO pairings made by a FIFO module, or the BP module may observe and record data about emulated FIFO pairings made by a BP module operating in FIFO emulation mode.

Figure 2:
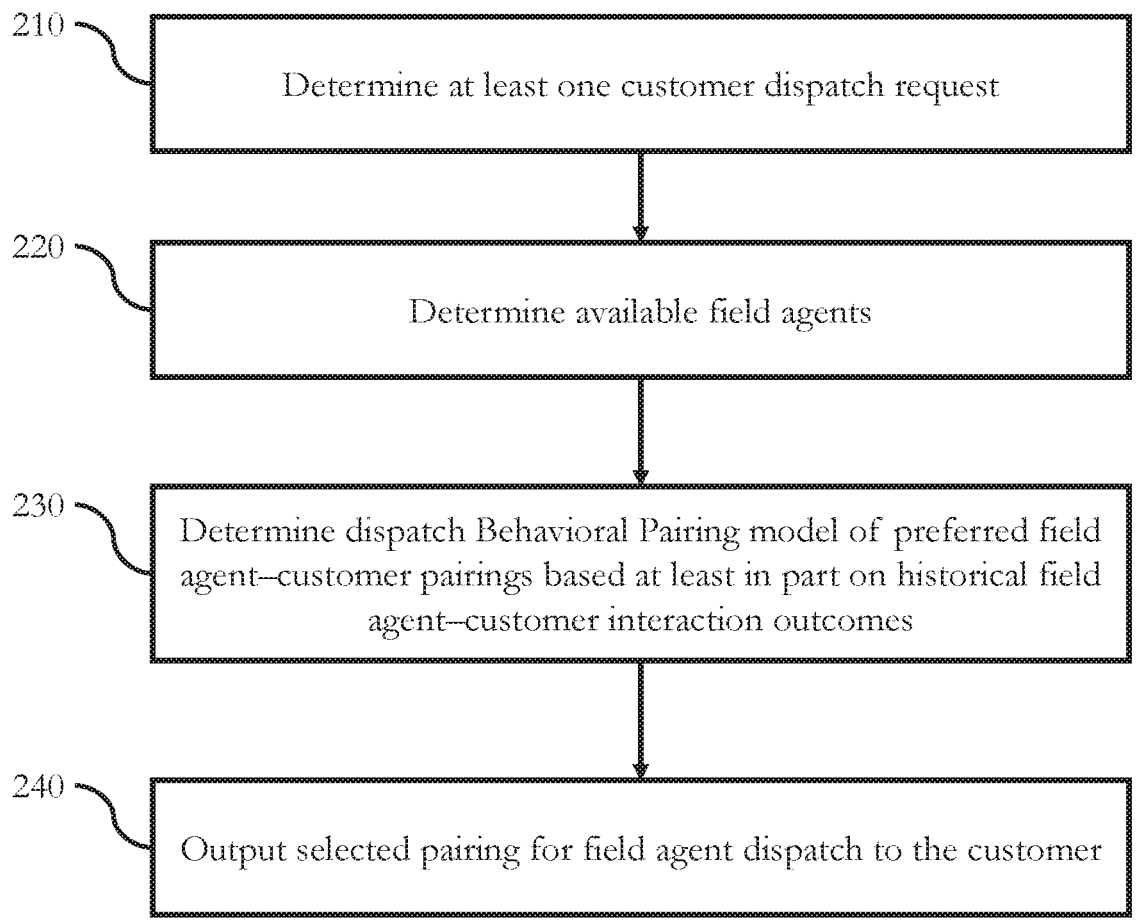
FIG. 2 shows an example of a BP dispatching method according to embodiments of the present disclosure.

FIG. 2 shows an example of a BP dispatching method 200 according to embodiments of the present disclosure. BP dispatching method 200 may begin at block 210.

At block 210, at least one customer dispatch request may be determined. For example, a customer may call a call center, and the call center agent may assess the customer's needs and determine that a field agent should be dispatched to provide technical service to the customer. In some embodiments, an interactive voice response (IVR) system or other automated computer system may assess the customer's needs and/or determine the at least one customer dispatch request. After—or in parallel with—determining the at least one customer dispatch request, BP dispatching method 200 may proceed to block 220.

At block 220, available field agents may be determined. In some embodiments, available field agents may be limited to those field agents that are available for immediate (or otherwise near-term) dispatch to the customer. In other embodiments, available field agents may be limited to those field agents that are available during the requested dates or time windows requested by the customer, or to those field agents that are available during dates or time windows suggested by the dispatcher (e.g., a call center agent). In other embodiments, the available field agents may be any or all of the agents assigned or otherwise delegated to a particular dispatch center or dispatch queue (e.g., local dispatch), regardless of potential scheduling constraints. After determining available field agents, BP dispatching method 200 may proceed to block 230.

At block 230, a dispatch BP model of preferred field agent-customer pairings may be determined, based at least in part on an analysis of historical field agent-customer interaction outcome data. In some embodiments, historical outcome data, customer attribute data (e.g., customer relationship management or CRM data), and/or third-party data may be analyzed, and a computer-generated model of preferred field agent-customer pairings may be generated. In some embodiments, the dispatch BP model may be based on a diagonal strategy for BP. In some embodiments, the dispatch BP model may be used to increase the overall performance of the dispatch center system while targeting a balanced utilization of field agents. After determining the dispatch BP model, BP dispatching method 200 may proceed to block 240.

At block 240, one of the field agents determined at block 220 may be selected for pairing to a customer whose request was determined at block 210 based on the dispatch BP model determined at block 230. In some embodiments, such as those in which the available field agents may be any or all of the agents assigned or otherwise delegated to a particular dispatch center or dispatch queue (e.g., local dispatch), regardless of potential scheduling constraints, the BP dispatching method 200 may suggest specific dates or time windows to the customer during which one or more preferred field agents would be available.

The selected pairing may be outputted to another component of the dispatch center system or otherwise displayed or used to assign the field agent and schedule the dispatch. After outputting the selected field agent-customer pairing, BP dispatching method 200 may end.

Figure 3:
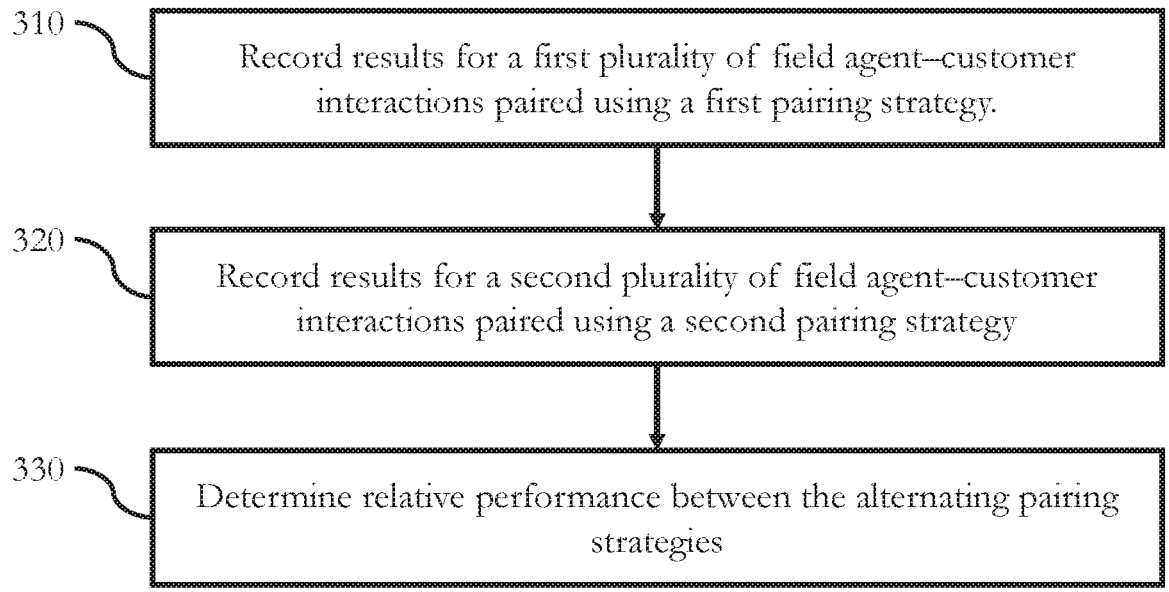
FIG. 3 depicts an example of a dispatch benchmarking method according to embodiments of the present disclosure.

FIG. 3 depicts an example of a dispatch benchmarking method 300 according to embodiments of the present disclosure. At block 310, dispatch benchmarking method 300 may begin.

At block 310, results for a first plurality of field agent-customer interactions paired using a first pairing strategy of alternating pairing strategies may be recorded or otherwise determined. For example, after a field technician finishes installing cable television service in a customer's home, the customer may be asked to rate the field technician's performance and answer other questions regarding customer satisfaction. In another example, a field technician may sell the customer additional products or services during the interaction, such as a warranty, a premium channel subscription, or a speaker system. During or after the interaction, the field technician may submit or otherwise record information about the sale. In another example, information about the interaction outcome may be recorded automatically, such as the amount of time the field technician spent during the interaction.

In some embodiments, the alternating strategies may be BP and a FIFO pairing strategy, and the first pairing strategy may be BP. In these embodiments, each of the first plurality of field agent-customer interactions may have been paired using BP and thus have a likelihood of improving the overall performance of the dispatch center compared with pairing using FIFO. In some embodiments, pairing strategies may alternate according to periodic cycling (e.g., cycling BP on and off). In some embodiments, the dispatch center system may cycle among more than two pairing strategies.

After—or in parallel with—determining results for a first plurality of field agent-customer interactions paired using the first pairing strategy, dispatch benchmarking method 300 may proceed to block 320.

At block 320, results for a second plurality of field agent-customer interactions paired using the second pairing strategy of the alternating pairing strategies may be recorded or otherwise determined. In some embodiments, the second pairing strategy may be FIFO or another non-BP pairing strategy. In these embodiments, each of the second plurality of field agent-customer interactions may have been paired using FIFO (or another non-BP pairing strategy) and thus likely have a worse overall performance of the dispatch center compared with pairing using BP. After determining results for the second plurality of field agent-customer interactions paired using the second pairing strategy, dispatch benchmarking method 300 may proceed to block 330.

At block 330, relative performance between the alternating pairing strategies may be determined. For example, if the alternating pairing strategies are BP and FIFO, dispatch benchmarking method may compare the performance of the first plurality of interactions with the performance of the second plurality of interactions. The relative performance may represent a performance gain achieved using BP instead of FIFO. In some embodiments, such as those in which BP is provided by a third-party vendor, payments to the third-party vendor may be calculated based at least in part on the extent of performance gain actually measured over a period of time that is attributable to BP.

At this point it should be noted that behavioral pairing in a dispatch center system in accordance with the present disclosure as described above may involve the processing of input data and the generation of output data to some extent. This input data processing and output data generation may be implemented in hardware or software. For example, specific electronic components may be employed in a behavioral pairing module or similar or related circuitry for implementing the functions associated with behavioral pairing in a dispatch center system in accordance with the present disclosure as described above. Alternatively, one or more processors operating in accordance with instructions may implement the functions associated with behavioral pairing in a dispatch center system in accordance with the present disclosure as described above. If such is the case, it is within the scope of the present disclosure that such instructions may be stored on one or more non-transitory processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for behavioral pairing in a dispatch center system comprising:

processing, by at least one dispatch center communicatively coupled to and configured to support behavioral pairing operations in the dispatch center system, a dispatch request for a customer based upon a customer request received at the dispatch center, wherein the dispatch center is configured to route the dispatch request to at least one queueing or switching component in the dispatch center system;

determining, by the at least one dispatch center, a plurality of field agents available to service the customer's dispatch request based upon the plurality of field agents assigned to the dispatch center;

generating, by at least one dispatch behavioral pairing module communicatively coupled to and configured to perform behavioral pairing operations in the dispatch center system, a model of preferred field agent-customer pairings based at least in part on historical field agent-customer interaction outcome data, wherein the model is determined further based upon information regarding the dispatch request and the plurality of field agents that is received from the dispatch center at the dispatch behavioral pairing module, wherein the model is used to increase the overall performance of the dispatch center system by causing the at least one queueing or switching component to more efficiently operate while targeting a balanced utilization of field agents;

selecting, by the at least one dispatch behavioral pairing module, one of the plurality of field agents based on the model; and outputting, by the at least one dispatch behavioral pairing module, the selection to facilitate routing the dispatch request to the at least one queueing or switching component in the dispatch center system and dispatching the selected field agent to the customer.

2. The method of claim 1, wherein the dispatch request comprises at least one requested dispatch time, and wherein determining the plurality of field agents available to service the customer's dispatch request is constrained based on the at least one requested dispatch time.

3. The method of claim 1, further comprising selecting, by the at least one dispatch behavioral pairing module, at least one suggested dispatch time, wherein the selected field agent is available during the at least one suggested dispatch time.

4. The method of claim 1, further comprising scheduling, by the at least one dispatch behavioral pairing module, the dispatching of the selected field agent to the customer.

5. The method of claim 1, further comprising:

recording, by the at least one dispatch behavioral pairing module, results for a first plurality of field-agent customer interactions paired using a behavioral pairing strategy;

recording, by the at least one dispatch behavioral pairing module, results for a second plurality of field-agent customer interactions paired using a FIFO pairing strategy; and outputting, by the at least one dispatch behavioral pairing module, a measure of a performance gain between the behavioral pairing strategy and the FIFO pairing strategy based on the recorded results for the first and second pluralities of field-agent customer interactions.

6. The method of claim 5, further comprising updating, by the at least one dispatch behavioral pairing module, the model based at least in part on one or more of: the results for the first plurality of field-agent customer interactions, the results for the second plurality of field-agent customer interactions, and the measure of the performance gain.

7. The method of claim 1, wherein the model is based on a diagonal behavioral pairing strategy, wherein field agents and customers having percentile rankings with closest midpoints comprise the preferred field agent-customer pairings.

8. A system for behavioral pairing in a dispatch center system comprising:
- at least one dispatch center communicatively coupled to and configured to support behavioral pairing operations in the dispatch center system, wherein the at least one dispatch center is further configured to:
  - process a dispatch request for a customer based upon a customer request received at the dispatch center, wherein the dispatch center routes the dispatch request to at least one queueing or switching component in the dispatch center system; and
  - determine a plurality of field agents available to service the customer's dispatch request based upon the plurality of field agents assigned to the dispatch center;
- at least one dispatch behavioral pairing module communicatively coupled to and configured to perform behavioral pairing operations in the dispatch center system, wherein the at least one dispatch behavioral pairing module is further configured to:
  - generate a model of preferred field agent-customer pairings based at least in part on historical field agent-customer interaction outcome data, wherein the model is determined further based upon information regarding the dispatch request and the plurality of field agents that is received from the dispatch center at the dispatch behavioral pairing module, wherein the model is used to increase the overall performance of the dispatch center system by causing the at least one queueing or switching component to more efficiently operate while targeting a balanced utilization of field agents;
  - select one of the plurality of field agents based on the model; and
  - output the selection to facilitate routing the dispatch request to the at least one queueing or switching component in the dispatch center system and dispatching the selected field agent to the customer.

9. The system of claim 8, wherein the dispatch request comprises at least one requested dispatch time, and wherein determining the plurality of field agents available to service the customer's dispatch request is constrained based on the at least one requested dispatch time.

10. The system of claim 8, wherein the at least one dispatch behavioral pairing module is further configured to select at least one suggested dispatch time, wherein the selected field agent is available during the at least one suggested dispatch time.

11. The system of claim 8, wherein the at least one dispatch behavioral pairing module is further configured to schedule the dispatching of the selected field agent to the customer.

12. The system of claim 8, wherein the at least one dispatch behavioral pairing module is further configured to:
- record results for a first plurality of field-agent customer interactions paired using a behavioral pairing strategy;
- record results for a second plurality of field-agent customer interactions paired using a FIFO pairing strategy; and
- output a measure of a performance gain between the behavioral pairing strategy and the FIFO pairing strategy based on the recorded results for the first and second pluralities of field-agent customer interactions.

13. The system of claim 12, wherein the at least one dispatch behavioral pairing module is further configured to update the model based at least in part on one or more of: the results for the first plurality of field-agent customer interactions, the results for the second plurality of field-agent customer interactions, and the measure of the performance gain.

14. The system of claim 8, wherein the model is based on a diagonal behavioral pairing strategy, wherein field agents and customers having percentile rankings with closest midpoints comprise the preferred field agent-customer pairings.

15. An article of manufacture for behavioral pairing in a dispatch center system comprising:
- at least one non-transitory processor readable medium; and
- instructions stored on the at least one medium;
- wherein the instructions are configured to be readable from the at least one medium by at least one computer processor in at least one dispatch center communicatively coupled to and configured to perform behavioral pairing operations in the dispatch center system and thereby cause the at least one dispatch center to operate so as to:
  - process a dispatch request for a customer based upon a customer request received at the dispatch center, wherein the dispatch center routes the dispatch request to at least one queueing or switching component in the dispatch center system; and
  - determine a plurality of field agents available to service the customer's dispatch request based upon the plurality of field agents assigned to the dispatch center;
- wherein the instructions are further configured to be readable from the at least one medium by at least one computer processor in at least one dispatch behavioral pairing module communicatively coupled to and configured to perform behavioral pairing operations in the dispatch center system and thereby cause the at least one dispatch behavioral pairing module to operate so as to:
  - generate a model of preferred field agent-customer pairings based at least in part on historical field agent-customer interaction outcome data, wherein the model is determined further based upon information regarding the dispatch request and the plurality of field agents that is received from the dispatch center at the dispatch behavioral pairing module, wherein the model is used to increase the overall performance of the dispatch center system by causing the at least one queueing or switching component to more efficiently operate while targeting a balanced utilization of field agents;
  - select one of the plurality of field agents based on the model; and
  - output the selection to facilitate routing the dispatch request to the at least one queueing or switching component in the dispatch center system and dispatching the selected field agent to the customer.

16. The article of manufacture of claim 15, wherein the dispatch request comprises at least one requested dispatch time, and wherein determining the plurality of field agents available to service the customer's dispatch request is constrained based on the at least one requested dispatch time.

17. The article of manufacture of claim 15, wherein the instructions further cause the at least one dispatch behavioral pairing module to operate so as to select at least one suggested dispatch time, wherein the selected field agent is available during the at least one suggested dispatch time.

18. The article of manufacture of claim 15, wherein the instructions further cause the at least one dispatch behavioral pairing module to schedule the dispatching of the selected field agent to the customer.

19. The article of manufacture of claim 15, wherein the instructions further cause the at least one dispatch behavioral pairing module to operate so as to:
- record results for a first plurality of field-agent customer interactions paired using a behavioral pairing strategy;
- record results for a second plurality of field-agent customer interactions paired using a FIFO pairing strategy; and
- output a measure of a performance gain between the behavioral pairing strategy and the FIFO pairing strategy based on the recorded results for the first and second pluralities of field-agent customer interactions.

20. The article of manufacture of claim 19, wherein the instructions further cause the at least one dispatch behavioral pairing module to operate so as to update the model based at least in part on one or more of: the results for the first plurality of field-agent customer interactions, the results for the second plurality of field-agent customer interactions, and the measure of the performance gain.

21. The article of manufacture of claim 15, wherein the model is based on a diagonal behavioral pairing strategy, wherein field agents and customers having percentile rankings with closest midpoints comprise the preferred field agent-customer pairings.

* * * * *